(12) United States Patent
Kubota et al.

(10) Patent No.: US 10,796,143 B2
(45) Date of Patent: Oct. 6, 2020

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventors: Satoshi Kubota, Kanagawa (JP); Shunichi Kimura, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 129 days.

(21) Appl. No.: 15/903,273

(22) Filed: Feb. 23, 2018

(65) Prior Publication Data

US 2018/0268212 A1 Sep. 20, 2018

(30) Foreign Application Priority Data

Mar. 16, 2017 (JP) ................. 2017-051773

(51) Int. Cl.
*G06K 9/00* (2006.01)
*G06K 9/03* (2006.01)
(Continued)

(52) U.S. Cl.
CPC ..... *G06K 9/00449* (2013.01); *G06K 9/00463* (2013.01); *G06K 9/03* (2013.01);
(Continued)

(58) Field of Classification Search
CPC .. G06K 9/00449; G06K 9/00463; G06K 9/03; G06K 9/3283; G06K 9/344; G06K 9/346
See application file for complete search history.

(56) References Cited

U.S. PATENT DOCUMENTS

| 4,926,490 A | * | 5/1990 | Mano | ................... G06K 9/3283 382/177 |
| 5,889,887 A | * | 3/1999 | Yabuki | ................... G06K 9/346 382/178 |

(Continued)

FOREIGN PATENT DOCUMENTS

| JP | 11-338969 A | 12/1999 |
| JP | 2011-113125 A | 6/2011 |

(Continued)

*Primary Examiner* — Santiago Garcia
(74) *Attorney, Agent, or Firm* — Sughrue Mion, PLLC

(57) ABSTRACT

An information processing apparatus includes: a first extracting unit that extracts a position of a character entry box in an input image; a recognizing unit that recognizes a character string written in the character entry box; a calculating unit that calculates recognition accuracy of each of characters of the character string recognized by the recognizing unit; a first detector that detects that a value based on the recognition accuracy is equal to or larger than a preset threshold value; a second extracting unit that extracts a position of a circumscribed rectangle for each character of the character string in the input image; a second detector that detects contact of the circumscribed rectangle with the character entry box; and a display that displays the character string to be corrected on the basis of a result of detection by the first detector and a result of detection by the second detector.

16 Claims, 8 Drawing Sheets

(51) Int. Cl.
G06K 9/34 (2006.01)
G06K 9/32 (2006.01)

(52) U.S. Cl.
CPC ........... G06K 9/3283 (2013.01); G06K 9/344 (2013.01); G06K 9/346 (2013.01); G06K 2209/01 (2013.01)

(56) References Cited

U.S. PATENT DOCUMENTS

| | | | | |
|---|---|---|---|---|
| 5,896,464 A * | 4/1999 | Horiuchi | G06K 9/346 | 358/482 |
| 5,915,039 A * | 6/1999 | Lorie | G06K 9/00463 | 382/209 |
| 6,035,059 A * | 3/2000 | Kurosawa | G06K 9/2018 | 382/164 |
| 6,226,402 B1 * | 5/2001 | Katsuyama | G06K 9/346 | 382/171 |
| 6,434,270 B1 * | 8/2002 | Ohara | G06K 9/346 | 382/178 |
| 6,720,965 B1 * | 4/2004 | Hirosawa | G09G 5/391 | 345/423 |
| 8,139,862 B2 * | 3/2012 | Shimodaira | G06K 9/348 | 382/172 |
| 8,452,095 B2 * | 5/2013 | Maekawa | G06K 9/40 | 382/176 |
| 9,171,205 B2 * | 10/2015 | Penna | G06K 9/38 | |
| 2002/0021840 A1 * | 2/2002 | Ohara | G06K 9/346 | 382/199 |
| 2003/0113019 A1 * | 6/2003 | Nakagawa | G06K 9/346 | 382/187 |
| 2007/0041643 A1 * | 2/2007 | Akagi | G06K 9/342 | 382/186 |
| 2010/0259558 A1 * | 10/2010 | Oba | G06K 9/346 | 345/619 |
| 2011/0255785 A1 * | 10/2011 | Hara | G06K 9/00456 | 382/182 |
| 2012/0237131 A1 * | 9/2012 | Ito | G06K 9/2063 | 382/229 |
| 2012/0269438 A1 * | 10/2012 | Kutsumi | G06K 9/3283 | 382/182 |
| 2013/0343652 A1 * | 12/2013 | Goto | G06K 9/342 | 382/182 |
| 2014/0355896 A1 * | 12/2014 | Osada | G06K 9/346 | 382/229 |
| 2015/0220265 A1 * | 8/2015 | Takahashi | G06F 3/04883 | 345/467 |
| 2016/0012315 A1 * | 1/2016 | Perrin | G06K 9/2063 | 382/161 |

FOREIGN PATENT DOCUMENTS

| | | |
|---|---|---|
| JP | 2013-069132 A | 4/2013 |
| JP | 5677139 B2 | 2/2015 |
| JP | 2015-097067 A | 5/2015 |

* cited by examiner

FIG. 5

| DEFINITION INFORMATION | COLUMN 1 | COLUMN 2 | COLUMN 3 | COLUMN 4 | COLUMN 5 | COLUMN 6 |
|---|---|---|---|---|---|---|
| | BOX NAME | BOX TYPE | POSITIONAL INFORMATION (UPPER END) | POSITIONAL INFORMATION (LOWER END) | POSITIONAL INFORMATION (LEFT END) | POSITIONAL INFORMATION (RIGHT END) |
| CONTENTS | NAME OF BOX | WHAT IS WRITTEN | y COORDINATE VALUE OF UPPER LEFT PIXEL OF BOX | y COORDINATE VALUE OF LOWER LEFT PIXEL OF BOX | x COORDINATE VALUE OF UPPER LEFT PIXEL OF BOX | x COORDINATE VALUE OF UPPER RIGHT PIXEL OF BOX |
| EXAMPLE | Field0001 | address | 322 | 380 | 46 | 100 |
| REMARKS | NAME UNIQUELY DETERMINED IN FORM | YURIGAOKA ASO-KU | SEE FIG. 6 FOR DETAILS OF COORDINATE SYSTEM | SEE FIG. 6 FOR DETAILS OF COORDINATE SYSTEM | SEE FIG. 6 FOR DETAILS OF COORDINATE SYSTEM | SEE FIG. 6 FOR DETAILS OF COORDINATE SYSTEM |

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-051773 filed Mar. 16, 2017.

BACKGROUND

(i) Technical Field

The present invention relates to an information processing apparatus, an information processing system, and a non-transitory computer readable medium.

(ii) Related Art

Conventionally, in data entry operations for entering data such as names and addresses on forms, persons enter such data by using a keyboard while referring to a form image or a result of optical character recognition (OCR) performed on the form image is manually checked and corrected. Various techniques for determining and correcting a recognition result obtained by OCR have been considered in order to correctly enter data.

SUMMARY

According to an aspect of the invention, there is provided an information processing apparatus including: a first extracting unit that extracts a position of a character entry box in an input image; a recognizing unit that recognizes a character string written in the character entry box; a calculating unit that calculates recognition accuracy of each of characters of the character string recognized by the recognizing unit; a first detector that detects that a value based on the recognition accuracy is equal to or larger than a preset threshold value; a second extracting unit that extracts a position of a circumscribed rectangle for each of the characters of the character string in the input image; a second detector that detects contact of the circumscribed rectangle with the character entry box; and a display that displays the character string to be corrected on a basis of a result of detection by the first detector and a result of detection by the second detector.

BRIEF DESCRIPTION OF THE DRAWINGS

Exemplary embodiments of the present invention will be described in detail based on the following figures, wherein:

FIG. 5 is an explanatory view illustrating an example of form definition information;

DETAILED DESCRIPTION

Outline of Exemplary Embodiment

An exemplary embodiment of the present invention provides an information processing apparatus including: a first extracting unit that extracts a position of a character entry box in an input image; a recognizing unit that recognizes a character string written in the character entry box; a calculating unit that calculates recognition accuracy of each of characters of the character string recognized by the recognizing unit; a first detector that detects that a value based on the recognition accuracy is equal to or larger than a preset threshold value; a second extracting unit that extracts a position of a circumscribed rectangle for each of the characters of the character string in the input image; a second detector that detects contact of the circumscribed rectangle with the character entry box; and a display that displays the character string to be corrected on a basis of a result of detection by the first detector and a result of detection by the second detector, wherein in a case where the recognition accuracy of the character string is equal to or larger than the preset threshold value and where contact of the circumscribed rectangle with the character entry box is detected, a recognition result is displayed so that the recognition result is manually checked and corrected.

The "recognition accuracy" as used herein refers to a degree of certainty of recognition of a character from an input image by a recognition unit. The "circumscribed rectangle" refers to a minimum rectangle that has sides parallel with coordinate axes of an input image and includes a character. Methods for calculating the recognition accuracy and the circumscribed rectangle will be described in detail later.

First Exemplary Embodiment

An exemplary embodiment of the present invention is described below in detail with reference to the drawings.
Configuration of Information Processing System
FIG. 1 is a configuration diagram illustrating an outline of an information processing system according to a first exemplary embodiment of the present invention.

Figure 1:
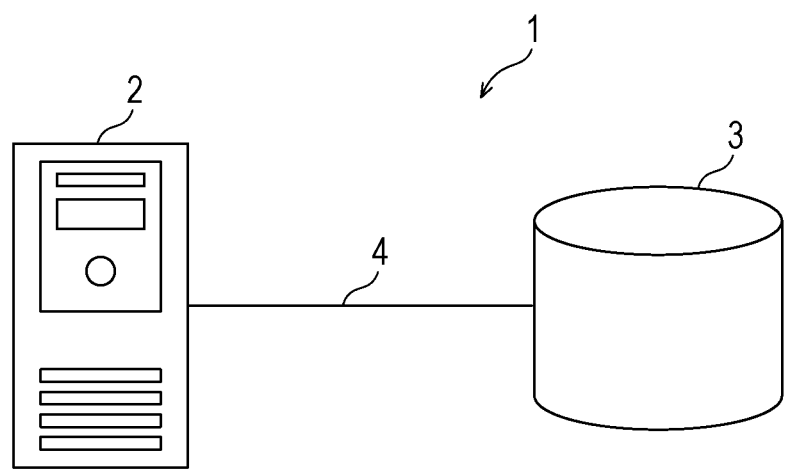
FIG. 1 is a configuration diagram illustrating an outline of an information processing system according to a first exemplary embodiment of the present invention.

As illustrated in FIG. 1, an information processing system 1 according to the present exemplary embodiment is configured such that an information processing apparatus 2 and a database 3 in which data processed by the information processing apparatus 2 is registered are connected through a line 4. The line 4 may be wired or may be wireless. Furthermore, the line 4 is not limited to one that directly connects the information processing apparatus 2 and the database 3 and can be a network such as a local area network (LAN).

The information processing apparatus 2 may be personal computer (PC) operated by a data entry operator (operator)

or may be something like a server that receives data entry from various departments and collectively processes the data. Details of the information processing apparatus 2 will be described later.

The database 3 is a mass memory and registers therein data processed and output by the information processing apparatus 2.

Configuration of Information Processing Apparatus

Figure 2:
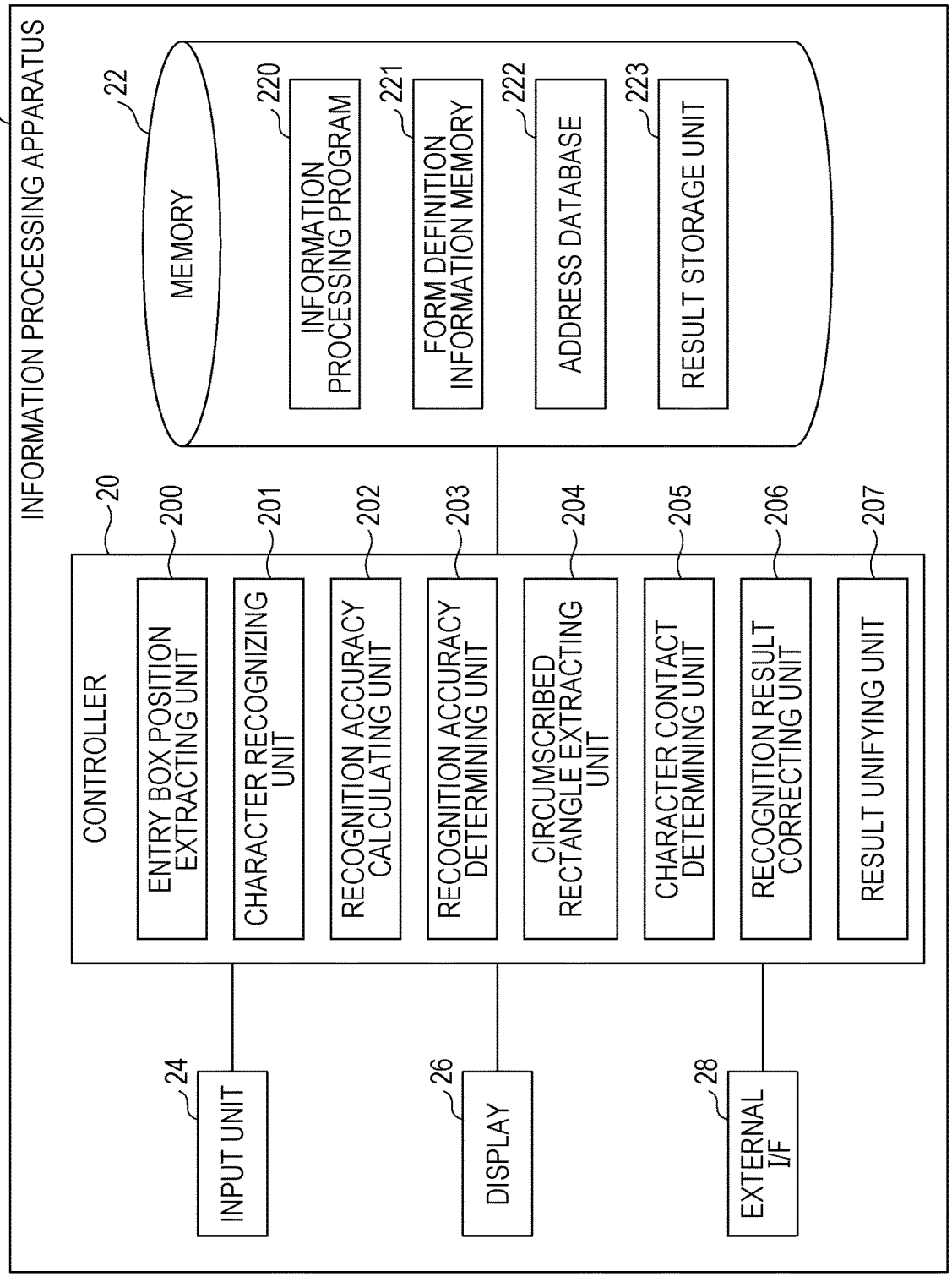
FIG. 2 is a configuration diagram illustrating an outline configuration of an information processing apparatus according to the first exemplary embodiment.

FIG. 2 is a configuration diagram illustrating an outline configuration of the information processing apparatus 2 according to the present exemplary embodiment.

As illustrated in FIG. 2, the information processing apparatus 2 includes a controller 20, a memory 22, an input unit 24, a display 26, and an external I/F 28.

The controller 20 is realized, for example, by a CPU and controls each unit and executes various programs.

The controller 20 includes an entry box position extracting unit 200, a character recognizing unit 201, a recognition accuracy calculating unit 202, a recognition accuracy determining unit 203, a circumscribed rectangle extracting unit 204, a character contact determining unit 205, a recognition result correcting unit 206, and a result unifying unit 207.

The memory 22 is realized by a recording medium such as a hard disk or a flash memory and stores information therein.

The memory 22 includes an information processing program 220, a form definition information memory 221, an address database 222, and a result storage unit 223.

The entry box position extracting unit 200 extracts a position of a character entry box in an input form image. The entry box position extracting unit 200 corresponds to a first extracting unit. The input form image is, for example, image data obtained by reading a form on which a name, an address, and the like are written by hand for example, by using a scanner. However, the input form image is not limited to an image read by a scanner and may be an image photographed by a digital camera or may be an image received by facsimile. When a form image is input, form definition information that is information indicating what is written where in the input form is input.

The entry box position extracting unit 200 extracts an actual entry box position in which a character string to be recognized is written in the input form on the basis of the input form image and the form definition information. For example, the entry box position extracting unit 200 calculates a relative displacement amount of the actually input form image from box position information preset by the form definition information and extracts a position thus found as an entry box position. The form definition information and extraction of a character entry box position will be described in detail later.

The character recognizing unit 201 recognizes a character string in a character entry box of a form image. For example, optical character recognition (OCR) is suitably used as the character recognizing unit 201.

The character entry box may be a single-character box or may be a plural-character box (character string box). In a case where the character entry box is a plural-character box, the character recognizing unit 201 cuts a character string into single-character candidates and recognizes each of the single-character candidates. In a case where the character entry box is a plural-character box, the box need not be made up of boxes for respective characters and may be a single large box in which plural characters are to be written. A character string is typically made up of plural characters but may be made up of a single character as a special case.

The recognition accuracy calculating unit 202 calculates recognition accuracy of a character string that is made up of a single character or plural characters recognized by the character recognizing unit 201. In a case where the character string is made up of a single character, a degree of certainty of a recognition result obtained by the character recognizing unit 201 is used as recognition accuracy as it is.

The recognition accuracy calculating unit 202 is not limited in particular. For example, an output value of a recognition device described in Japanese Unexamined Patent Application Publication No. 2011-113125 or Japanese Unexamined Patent Application Publication No. 2013-069132 may be used as recognition accuracy.

For example, a method for calculating an output value of the recognition device described in Japanese Unexamined Patent Application Publication No. 2011-113125 is briefly described below. Target data (image data) that has been input is first subjected to filtering, and each pixel obtained as a result of filtering is subjected to non-linear function processing. Although a sigmoid function such as a logistic function or a hyperbolic tangent function is used as the non-linear function, other functions may be used as long as a predetermined condition is met.

Next, each pixel is subjected to shrinking processing and is then subjected to non-linear function processing again. Each pixel is weighted, a total sum of all of the pixels is found, and a bias is added thereto. The result thus obtained is subjected to computation using non-linear functions. These non-linear functions may be ones similar to the aforementioned one. An image thus obtained is subjected to computation using a predetermined enhancement function and normalization and is then finally output.

In the present exemplary embodiment, this final output value is used as an example of recognition accuracy. However, a method for calculating recognition accuracy is not limited to this and may be any of other calculation methods.

The recognition accuracy determining unit 203 detects that calculated recognition accuracy is equal to or larger than a preset threshold value by comparing the recognition accuracy with the threshold value. That is, the recognition accuracy determining unit 203 corresponds to a first detector. In a case where the recognition accuracy is smaller than the threshold value, there is a possibility of false recognition, and therefore a recognition result is displayed on the display 26 so that an operator can check and correct the recognition result.

The circumscribed rectangle extracting unit 204 extracts a position of a circumscribed rectangle for each character written in a character entry box of a form image. The circumscribed rectangle extracting unit 204 corresponds to a second extracting unit.

The character contact determining unit 205 detects contact of a character with the character entry box on the basis of the extracted entry box position and the extracted position of the circumscribed rectangle. That is, the character contact determining unit 205 corresponds to a second detector. For example, contact between a character string and a character entry box may be detected in a case where at least one character included in the character string is in contact with the character entry box or may be detected in a case where the number of characters in contact with the character entry box is larger than a predetermined number.

The recognition result correcting unit 206 corrects data of a recognition result on the basis of correct data when the operator enters the correct data by using the input unit 24 after checking the recognition result displayed on the display 26.

The result unifying unit 207 unifies a result of correction by the recognition result correcting unit 206 and a result of recognition by the character recognizing unit 201. Data output from the result unifying unit 207 is data output from the information processing apparatus 2.

The information processing program 220 stored in the memory 22 causes the controller 20 to function as the aforementioned units. The form definition information memory 221 stores therein form definition information that is input by using the input unit 24 together with a form image. The address database 222 stores therein address data and is referred to when a recognition result is checked. The result storage unit 223 stores therein data for output unified by the result unifying unit 207.

As the input unit 24, a keyboard, a mouse, a touch panel, or the like can be appropriately selected. The display 26 displays characters, an image, and the like and is realized, for example, by a display device. The external I/F 28 connects the information processing apparatus 2 to the external database 3 or other system apparatuses, for example, through the line 4.

Operation According to First Exemplary Embodiment

Figure 3:
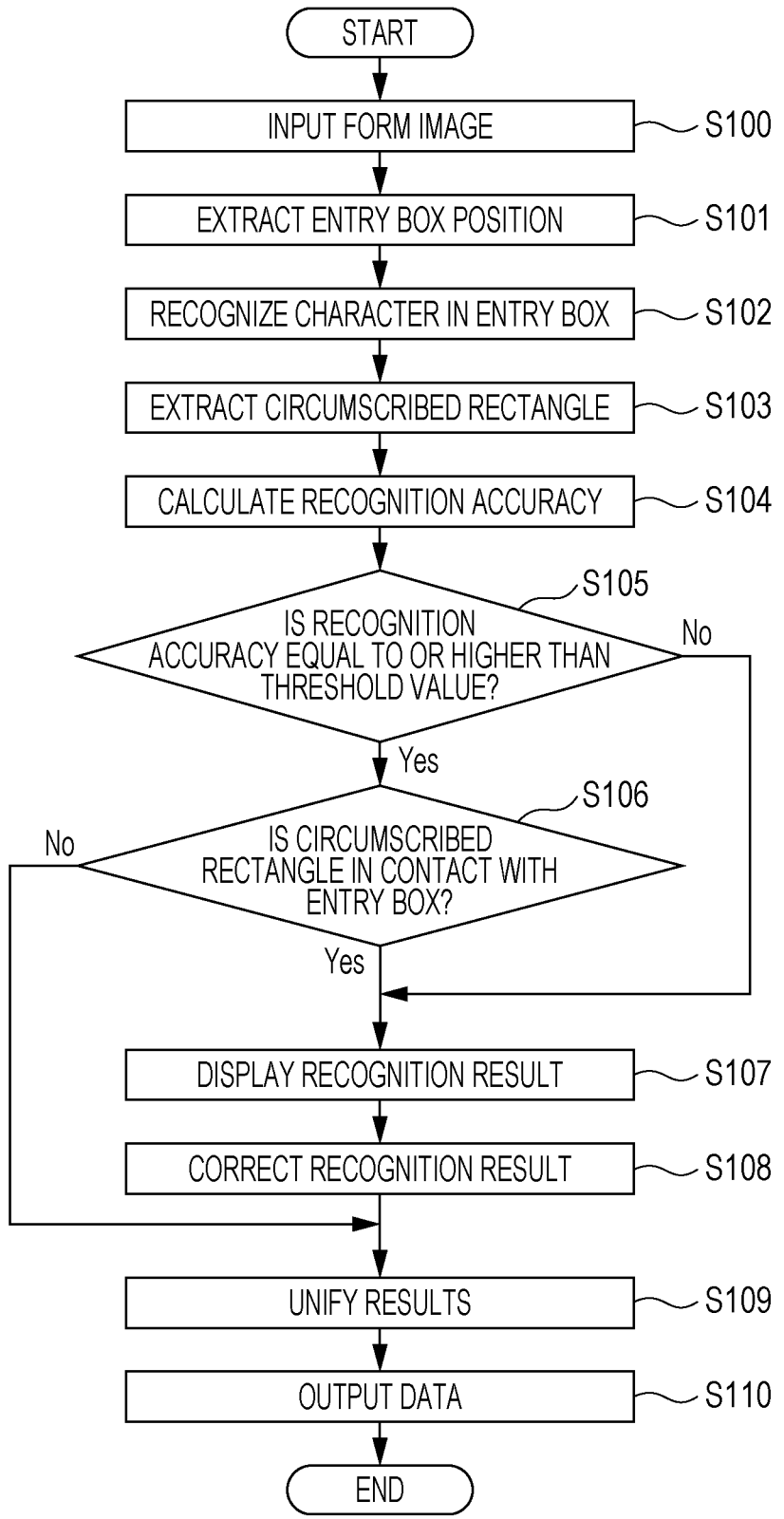
FIG. 3 is a flowchart illustrating an example of an operation of the information processing apparatus according to the first exemplary embodiment.

Next, an operation of the information processing apparatus 2 according to the first exemplary embodiment of the present invention is described with reference to FIG. 3. FIG. 3 is a flowchart illustrating an example of an operation of the information processing apparatus 2 according to the first exemplary embodiment.

Figure 4:
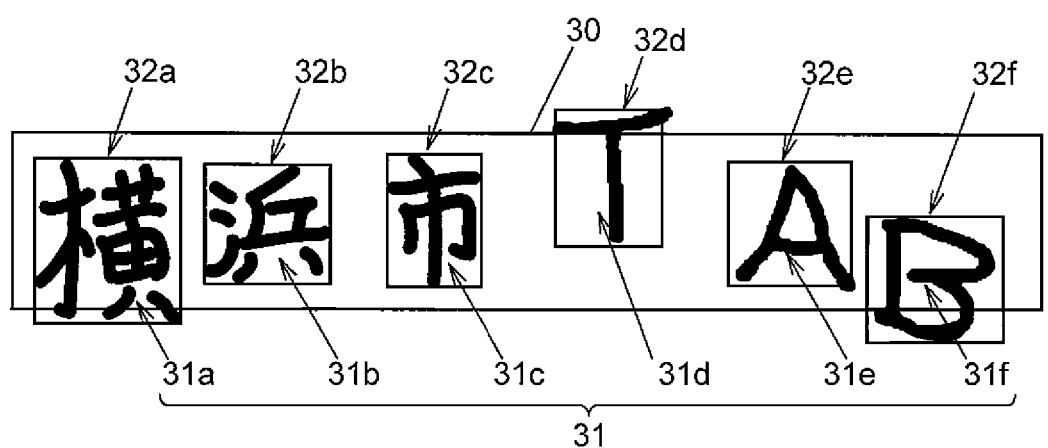
FIG. 4 is an explanatory view illustrating an example of a character entry box in which characters are written in a form image.

First, a form image is input by using the input unit 24 (S100). In this step, form definition information is input together with the form image. FIG. 4 illustrates an example of a character entry box in which characters are written in a form image, and FIG. 5 illustrates an example of form definition information.

As illustrated in FIG. 4, a character string 31 (31a through 31f) are written by hand in a character entry box 30. In the example illustrated in FIG. 4, the character entry box 30 is made up of a single large box, and six characters "🈯" 31a, "🈯" 31b, "🈯" 31c, "T" 31d, "A" 31e, and "B" 31f are written by hand in the character entry box 30, and these six characters constitute the single character string 31 (an address in this case (an imaginary address is used as an example)).

The form definition information is information indicating what is written where in an input form and is constituted, for example, by a box name, a box type, and box positional information indicating upper end, lower end, left end, and right end of the box, as illustrated in FIG. 5.

Figure 6:
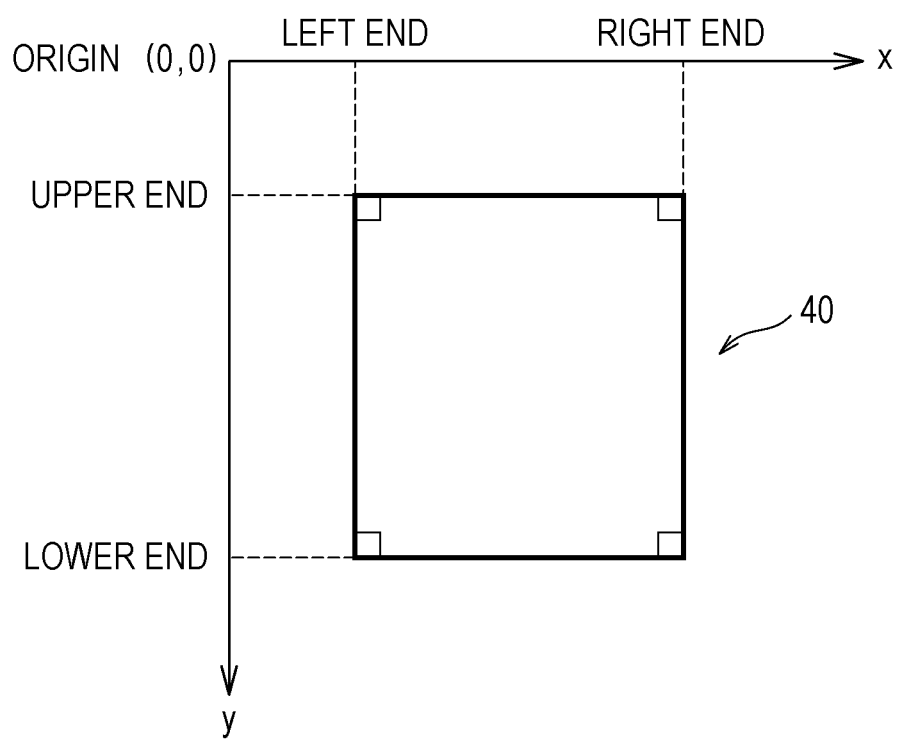
FIG. 6 is an explanatory view illustrating an example of a coordinate system of positional information of a box.

FIG. 6 illustrates an example of a coordinate system of positional information of a box. As illustrated in FIG. 6, for example, a coordinate system of positional information of a box has an origin (0, 0) at an upper left and uses a horizontal axis as an x axis and a vertical axis as a y axis in a form image, and a position of a box 40 is defined by a y coordinate of an upper end, a y coordinate of a lower end, an x coordinate of a left end, and an x coordinate of a right end of the box 40.

The form definition information need not be input together with a form image every time the form image is input and may be stored in advance as text information such as a comma separated value (CSV) file unless the input form is changed. This form definition information is stored in the form definition information memory 221 of the memory 22.

Next, the entry box position extracting unit 200 extracts an actual entry box position in which an entered character string to be recognized is written in the form image by calculating a relative displacement amount of the form image that has been actually input on the basis of the input form image and the box position information of the input form definition information (S101). In the example illustrated in FIG. 4, coordinates of four vertexes of the rectangular character entry box 30 in the coordinate system set in the form image are extracted.

Next, the character recognizing unit 201 recognizes the character string in the character entry box 30 (S102). For example, the character string is cut out by recognizing the characters in the character entry box 30 of the input form image one by one by using OCR. The character string is cut out at a position just inside the character entry box 30. Therefore, in a case where an upper horizontal line overlaps the character entry box 30 (e.g., the character "T" 31d in FIG. 4), this upper horizontal line is also cut off, and there is a possibility that the character "T" be falsely recognized as "I". Furthermore, in a case where a lower horizontal line overlaps the character entry box 30 (e.g., the character "B" 31f), this lower horizontal line is also cut off, and there is a possibility that the character "B" be falsely recognized as "R". It is therefore necessary to detect contact between a character and the character entry box 30 as described later.

In view of this, the circumscribed rectangle extracting unit 204 extracts a circumscribed rectangle for each character to be recognized in the character entry box 30 (S103). For example, in the example illustrated in FIG. 4, a circumscribed rectangle 32a is extracted for the character "🈯" 31a. Similarly, circumscribed rectangles 32b, 32c, 32d, 32e, and 32f are extracted for the characters "🈯" 31b, "🈯" 31c, "T" 31d, "A" 31e, and "B" 31f, respectively.

Next, the recognition accuracy calculating unit 202 calculates recognition accuracy S of a single character or a character string recognized by the character recognizing unit 201 (S104). In a case of a single character, a degree of certainty of a recognition result obtained by the character recognizing unit 201 is used as the recognition accuracy S as it is. This degree of certainty is, for example, an output value of the recognition device described in Japanese Unexamined Patent Application Publication No. 2011-113125, as described above.

In the case of a character string, for example, a minimum one of values of recognition accuracy of respective characters included in the character string is calculated as recognition accuracy of the character string. Alternatively, a maximum one of values of recognition accuracy of respective characters included in the character string may be calculated as recognition accuracy of the character string or an average of values of recognition accuracy of respective characters included in the character string may be calculated as recognition accuracy of the character string.

For example, assume that values of recognition accuracy of the respective characters "🈯" 31a, "🈯" 31b, "🈯" 31c, "T" 31d, "A" 31e, and "B" 31f are 0.6, 0.8, 1.0, 0.6, 0.9, and 0.8, respectively in the example illustrated in FIG. 4. For example, assume that a minimum one of the values of recognition accuracy of the respective characters is recognition accuracy of the character string, the recognition accuracy "0.6" of "🈯" 31a is minimum and is therefore used as recognition accuracy of the character string "🈯 🈯 🈯".

Next, the recognition accuracy determining unit 203 detects that the calculated recognition accuracy S is equal to or larger than a preset threshold value T by comparing the recognition accuracy S of the character string with the threshold value T (S105).

For example, the recognition accuracy S of the character string "▨ ▨ ▨" is 0.6 in a case where a minimum one of the values of recognition accuracy of the respective characters is used as the recognition accuracy of the character string in the example of FIG. 4. Therefore, assume that the threshold value T is 0.8, the recognition accuracy S is smaller than the threshold value T, and the recognition accuracy determining unit 203 does not detect that the recognition accuracy S is equal to or larger than the threshold value T. For example, in a case where an average of the values of recognition accuracy of the respective characters is used as recognition accuracy of the character string, the recognition accuracy S of the character string "▨ ▨ ▨" in the example illustrated in FIG. 4 is (0.6+0.8+1.0+0.6+0.9+0.8)÷6 and a resulting value rounded to one decimal place is 0.8. In this case, the recognition accuracy S is equal to or larger than the threshold value T, and therefore the recognition accuracy determining unit 203 detects that the recognition accuracy S is equal to or larger than the threshold value T.

In a case where the recognition accuracy determining unit 203 detects that the recognition accuracy S is equal to or larger than the threshold value T (Yes in S105), a possibility of false recognition of the recognition result is considered to be low, but next the character contact determining unit 205 detects contact between a character and the character entry box 30 (S106).

In a case where the character contact determining unit 205 detects contact between a character and the character entry box 30 (Yes in S106), there is a possibility of false recognition, and therefore the recognition result is displayed on the display 26 so that an operator can check and correct the recognition result (S107). In this step, for example, the recognized character string may be hatched or may be displayed in a different color in order to indicate a possibility of false recognition.

The operator checks the displayed recognition result, corrects the recognized character string if necessary, and enters a correct character string by using the input unit 24. The recognition result correcting unit 206 corrects data of the recognized character string upon entry of correction by the operator (S108). In a case where the recognized character string indicates an address, correct data may be checked, for example, by using the address database 222 of the memory 22 when the recognized character string is checked or corrected.

In a case where the recognition accuracy S is smaller than the threshold value T and the recognition accuracy determining unit 203 does not detect that the recognition accuracy S is equal to or larger than the threshold value T (NO in S105), there is a high possibility of false recognition of the recognition result, and therefore also in this case, the recognition result is displayed on the display 26 so that the operator can check and correct the recognition result (S107).

In a case where the character contact determining unit 205 does not detect contact between a character and the character entry box 30 (No in S106) or in a case where the recognition result has been checked and corrected, a result of correction by the recognition result correcting unit 206 and a result of recognition by the character recognizing unit 201 are unified by the result unifying unit 207 (S109). The unified data is stored in the result storage unit 223 of the memory 22.

The finally unified data is supplied to the database 3 from the external I/F 28 through the line 4 (S110). This data may be output each time or data stored in the result storage unit 223 may be collectively output.

As described above, in the present exemplary embodiment, by combining detection as to whether or not recognition accuracy of a character string is equal to or larger than a predetermined threshold value and detection as to whether or not a character and the character entry box 30 are in contact, the recognized character string is classified into data that need manual checking and correcting operations and data that does not need manual checking and correcting operations, and thereby the number of manual entries in data entry operation is reduced.

Second Exemplary Embodiment

In a second exemplary embodiment of the present invention, first, contact between a character entry box 30 of an input form image and a circumscribed rectangle for a character in the character entry box 30 is detected, and a recognition result is displayed and is then manually checked and corrected in a case where the contact is detected. In a case where the contact is not detected, recognition accuracy is calculated and is compared with a predetermined threshold value. In a case where the recognition accuracy is equal to or larger than the threshold value, data is input in a system without correction.

A configuration of an information processing apparatus according to the second exemplary embodiment is similar to the information processing apparatus 2 according to the first exemplary embodiment illustrated in FIG. 2. That is, the second exemplary embodiment is the same as the first exemplary embodiment in terms of an apparatus configuration but is different from the first exemplary embodiment in terms of an operation of the apparatus.

Operation According to Second Exemplary Embodiment

Figure 7:
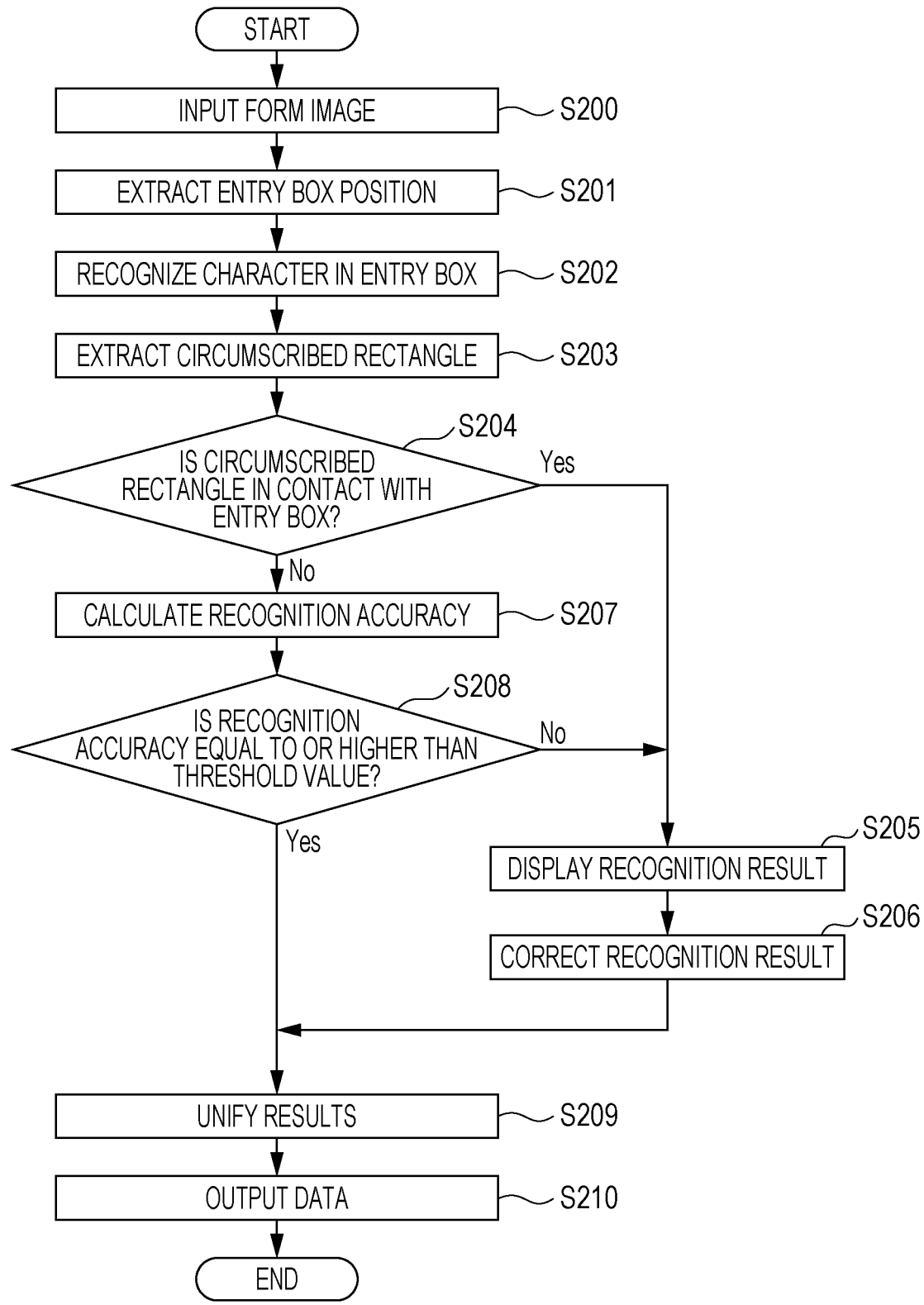
FIG. 7 is a flowchart illustrating an example of an operation of an information processing apparatus according to a second exemplary embodiment of the present invention.

An operation of an information processing apparatus 2 according to the second exemplary embodiment of the present invention is described with reference to FIG. 7. FIG. 7 is a flowchart illustrating an example of an operation of the information processing apparatus 2 according to the second exemplary embodiment.

First, a form image and form definition information are input by using an input unit 24 (S200). Next, an entry box position extracting unit 200 extracts an actual entry box position in which an entered character string to be recognized is written in the form image (S201). Then, a character recognizing unit 201 recognizes the character string in the character entry box 30 (S202). Next, a circumscribed rectangle extracting unit 204 extracts a circumscribed rectangle for each character to be recognized in the character entry box 30 (S203). These steps are similar to those in the first exemplary embodiment.

In the present exemplary embodiment, next, a character contact determining unit 205 detects contact between a character and the character entry box 30 (S204).

In a case where contact between a character and the character entry box 30 is detected by the character contact determining unit 205 (Yes in S204), there is a possibility of false recognition, and therefore a recognition result is displayed on a display 26 so that an operator can check and correct the recognition result (S205). The operator checks the displayed recognition result, and enters a correct character string by using the input unit 24 in order to correct the recognized character string if necessary. A recognition result correcting unit 206 corrects data of the recognized character string upon entry of correction by the operator (S206).

In a case where contact between a character and the character entry box 30 is not detected by the character contact determining unit 205 (No in S204), a recognition accuracy calculating unit 202 calculates recognition accuracy S of a single character or a character string recognized by the character recognizing unit 201 (S207). A method for calculating recognition accuracy in this step is similar to that in the first exemplary embodiment.

Next, whether or not the calculated recognition accuracy is equal to or larger than a predetermined threshold value is detected by comparing the recognition accuracy with the predetermined threshold value (S208). In a case where the recognition accuracy is smaller than the threshold value and it is not detected that the recognition accuracy is equal to or larger than the threshold value (No in S208), there is a high possibility of false recognition, and therefore the recognition result is displayed on the display 26 so that the operator can check and correct the recognition result (S205). Then, the operator checks and corrects the recognition result (S206). A result of correction is unified with a result of recognition by a result unifying unit 207 (S209).

Meanwhile, in a case where it is detected that the recognition accuracy is equal to or larger than the threshold value (Yes in S208), the result unifying unit 207 unifies results (S209). The unified result is stored in a result storage unit 223. Then, the finally unified data is output through an external I/F 28 and is registered in a database 3 (S210).

As described above, according to the second exemplary embodiment, first, a circumscribed rectangle for each character is extracted and contact thereof with the character entry box 30 is detected, and recognition accuracy is calculated only in a case where contact is not detected. In this way, a recognized character string may be more efficiently classified into data that needs manual checking and correcting operations and data that does not need manual checking and correcting operations.

Third Exemplary Embodiment

In a third exemplary embodiment of the present invention, detection as to whether or not recognition accuracy is equal to or larger than a threshold value and detection as to whether or not a character and a character entry box 30 are in contact in the first exemplary embodiment are performed for each character of an entered character string one by one.

A configuration of an information processing apparatus according to the third exemplary embodiment is similar to the information processing apparatus 2 according to the first exemplary embodiment. In the present exemplary embodiment, an order of operations of units of the information processing apparatus 2 are different from that in the first exemplary embodiment.

Operation According to Third Exemplary Embodiment

Figure 8:
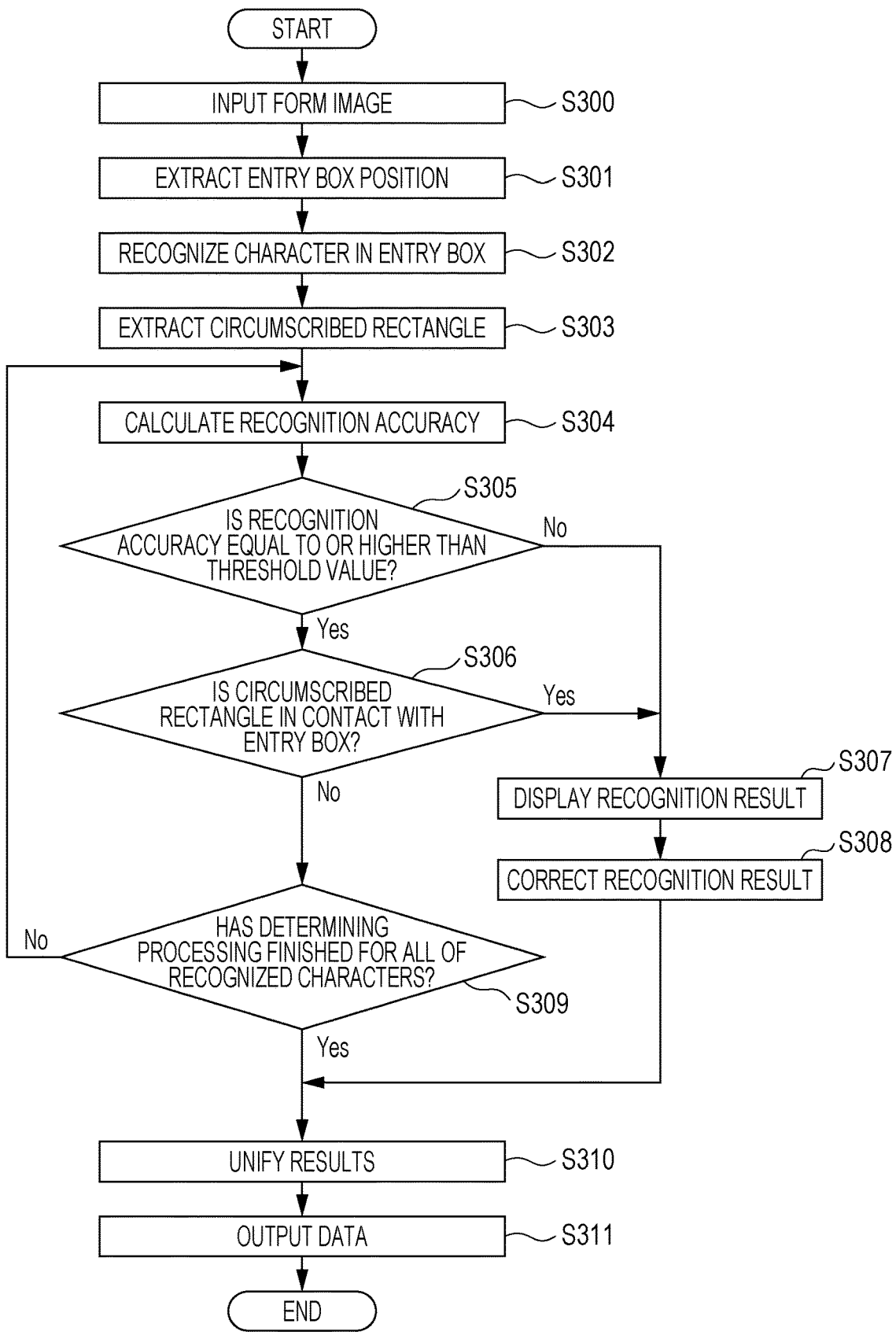
FIG. 8 is a flowchart illustrating an example of an operation of an information processing apparatus according to a third exemplary embodiment of the present invention.

An operation of the information processing apparatus 2 according to the third exemplary embodiment of the present invention is described with reference to FIG. 8. FIG. 8 is a flowchart illustrating an example of an operation of the information processing apparatus 2 according to the third exemplary embodiment.

First, a form image and form definition information are input by using an input unit 24 (S300). Next, an entry box position extracting unit 200 extracts an actual entry box position in which an entered character string to be recognized is written in the form image (S301). Then, a character recognizing unit 201 recognizes the character string in the character entry box 30 (S302). Next, a circumscribed rectangle extracting unit 204 extracts a circumscribed rectangle for each character to be recognized in the character entry box 30 (S303). These steps are similar to those in the first exemplary embodiment.

Then, calculation of recognition accuracy and detection as to whether or not the recognition accuracy is equal to or larger than a threshold value and detection as to whether or not a character and the character entry box 30 are in contact are performed for each character of an entered character string one by one.

First, recognition accuracy of an initial character of the character string is calculated (S304). The initial character of the character string is a character that is written first in the character entry box 30. In the example illustrated in FIG. 4, the initial character of the character string is the leftmost character "  " 31a in the character entry box 30.

After the recognition accuracy of this character is calculated, a recognition accuracy determining unit 203 detects whether or not the calculated recognition accuracy is equal to or larger than a predetermined threshold value (S305).

In a case where the recognition accuracy is smaller than the threshold value and the recognition accuracy determining unit 203 does not detect that the recognition accuracy is equal to or larger than the predetermined threshold value (No in S305), there is a high possibility of false recognition of this character, and therefore a recognition result is displayed on a display 26 (S307).

Meanwhile, in a case where the recognition accuracy determining unit 203 detects that the recognition accuracy is equal to or larger than the predetermined threshold value (Yes in S305), a character contact determining unit 205 detects contact between this character and the character entry box 30 (S306).

In a case where contact between this character and the character entry box 30 is detected (Yes in S306), there is a high possibility of false recognition of a character string including this character, and therefore the recognition result is displayed on the display 26 (S307).

Meanwhile, in a case where contact between this character and the character entry box 30 is not detected (No in S306), processing of a next character in the character string is performed. That is, it is determined whether or not processing of all of the characters in the recognized character string has been finished (S309).

In a case where the processing has not been finished for all of the characters in the recognized character string (No in S309), recognition accuracy of a next character ("  " 31b is a character next to the character "  " 31a in the example illustrated in FIG. 4) of the character string is calculated (S304), and the above processing is repeated thereafter.

Meanwhile, in a case where the recognition accuracy determining unit 203 does not detect that the recognition accuracy is equal to or larger than the threshold value or in a case where the recognition accuracy determining unit 203 detects that the recognition accuracy is equal to or larger than the threshold value but contact of a circumscribed rectangle with the character entry box 30 is detected, the recognition result is displayed on the display 26 and is then checked and corrected (S308).

As described above, in checking and correction of a recognition result, in a case where a possibility of false recognition is detected for a certain character, detection as to recognition accuracy or detection as to contact with the character entry box 30 is not performed as for subsequent characters in the character string. Since the recognized character string for which false recognition has been detected at least for the certain character is displayed on the display 26, an operator performs a checking and correcting operation while looking at this recognized character string.

In both of a case where the recognized character string is checked and corrected and a case where the processing has been finished for all characters in the character string, a result unifying unit 207 unifies results (S310).

The unified result is stored in a result storage unit 223. Then, the unified result is output through an external I/F 28 and is registered in a database 3 (S311).

As described above, in the third exemplary embodiment, detection as to whether or not recognition accuracy is equal to or larger than a threshold value and detection as to whether or not a character and a character entry box are in contact are performed for each character of a character string one by one. In a case where it is determined for a certain character in the character string that recognition accuracy is smaller than the threshold value or that the character is in contact with the character entry box, the detection as to recognition accuracy and the character entry box need not be performed for subsequent characters. As a result, a data entry operation may be performed efficiently.

The exemplary embodiments of the present invention have been described above, but the present invention is not limited to the above exemplary embodiments and can be modified in various ways without departing from the scope of the present invention. For example, in the exemplary embodiment, the information processing program 220 may be offered by being recorded on a recording medium such as a CD-ROM.

Part or all of each of the units that constitute the controller 20 may be realized by a hardware circuit such as a field programmable gate array (FPGA) or an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor configured to execute:
 a first extracting unit that extracts a position of a character entry box in an input image;
 a recognizing unit that recognizes a character string written in the character entry box;
 a calculating unit that calculates recognition accuracy of each of characters of the character string recognized by the recognizing unit;
 a first detector that detects that a value based on the recognition accuracy is equal to or larger than a preset threshold value;
 a second extracting unit that extracts a position of a circumscribed rectangle for each of the characters of the character string in the input image;
 a second detector that detects contact of the circumscribed rectangle with the character entry box; and
 a display configured to display the character string to be corrected using a result of detection by the first detector and a result of detection by the second detector,
wherein the calculating unit calculates the recognition accuracy of each of characters of the character string recognized by the recognizing unit only if the second detector detects that the circumscribed rectangle is not in contact with the character entry box.

2. The information processing apparatus according to claim 1, wherein the display is configured to, if the first detector does not detect that the value based on the recognition accuracy is equal to or larger than the threshold value, then display the character string to be corrected.

3. The information processing apparatus according to claim 2, wherein the first detector and the second detector perform detection for each of the characters of the character string one by one, and
wherein the display is configured to, if the first detector does not detect that the recognition accuracy of the character is equal to or larger than the threshold value, then display the character string to be corrected.

4. The information processing apparatus according to claim 1, wherein the display is configured to, if the first detector detects that the value based on the recognition accuracy is equal to or larger than the threshold value and if the second detector detects contact of the circumscribed rectangle for any of the characters of the character string with the character entry box, then display the character string to be corrected.

5. The information processing apparatus according to claim 4, wherein the first detector and the second detector perform detection for each of the characters of the character string one by one, and
wherein the display is configured to, if the first detector detects that the recognition accuracy of the character is equal to or larger than the threshold value and if the second detector detects contact of the circumscribed rectangle for the character with the character entry box, then display the character string to be corrected.

6. The information processing apparatus according to claim 1, wherein the display is configured to, if the second detector detects contact of the circumscribed rectangle for any of the characters of the character string with the character entry box or if the second detector does not detect contact of the circumscribed rectangle for any of the characters of the character string with the character entry box and if the first detector does not detect that the value based on the recognition accuracy is equal to or larger than the threshold value, then display the character string to be corrected.

7. The information processing apparatus according to claim 6, wherein the calculating unit calculates the recognition accuracy only if the second detector does not detect contact of the circumscribed rectangle for any of the characters of the character string with the character entry box.

8. An information processing system comprising:
the information processing apparatus according to claim 1; and
a database in which data generated from the character string in the input image by the information processing apparatus is registered.

9. An information processing system comprising:
the information processing apparatus according to claim 2; and
a database in which data generated from the character string in the input image by the information processing apparatus is registered.

10. An information processing system comprising:
the information processing apparatus according to claim 3; and
a database in which data generated from the character string in the input image by the information processing apparatus is registered.

11. An information processing system comprising:
the information processing apparatus according to claim 4; and
a database in which data generated from the character string in the input image by the information processing apparatus is registered.

12. An information processing system comprising:
the information processing apparatus according to claim 5; and
a database in which data generated from the character string in the input image by the information processing apparatus is registered.

13. An information processing system comprising:
the information processing apparatus according to claim 6; and
a database in which data generated from the character string in the input image by the information processing apparatus is registered.

14. An information processing system comprising:
the information processing apparatus according to claim 7; and
a database in which data generated from the character string in the input image by the information processing apparatus is registered.

15. A non-transitory computer readable medium storing a program that, if executed, then causes a computer to execute a process comprising:
(a) extracting a position of a character entry box in an input image;
(b) recognizing a character string written in the character entry box;
(C) calculating recognition accuracy of each of characters of the character string recognized in the (b) recognizing;
(d) detecting that a value based on the recognition accuracy is equal to or larger than a preset threshold value;
(e) extracting a position of a circumscribed rectangle for each of the characters of the character string in the input image;
(f) detecting contact of the circumscribed rectangle with the character entry box; and
(g) displaying the character string to be corrected using a result of the (d) detecting and a result of the (f) detecting,
wherein the calculating comprises calculating the recognition accuracy of each of characters of the character string recognized by the recognizing only if the detecting contact detects that the circumscribed rectangle is not in contact with the character entry box.

16. An information processing apparatus comprising:
at least one processor configured to execute:
a first extracting unit that extracts a position of a character entry box in an input image;
a recognizing unit that recognizes a character string written in the character entry box;
a calculating unit that calculates recognition accuracy of each of characters of the character string recognized by the recognizing unit;
a first detector that detects that a value based on the recognition accuracy is equal to or larger than a preset threshold value;
a second extracting unit that extracts a position of a circumscribed rectangle for each of the characters of the character string in the input image;
a second detector that detects contact of the circumscribed rectangle with the character entry box; and
a display configured to display the character string to be corrected using a result of detection by the first detector and a result of detection by the second detector,
wherein the calculating unit refrains from calculating the recognition accuracy of each of characters of the character string recognized by the recognizing unit if the second detector detects contact of the circumscribed rectangle with the character entry box.

\* \* \* \* \*